United States Patent [19]

Walker

[11] Patent Number: 4,571,320
[45] Date of Patent: Feb. 18, 1986

[54] METHOD AND APPARATUS FOR LOADING AND UNLOADING SHEET MOLDING COMPOUND IN AND FROM A PRESS

[75] Inventor: James D. Walker, Warren, Mich.

[73] Assignee: General Motors Corporation, Detroit, Mich.

[21] Appl. No.: 667,169

[22] Filed: Oct. 31, 1984

[51] Int. Cl.[4] ............................................. B29C 7/00
[52] U.S. Cl. ................................... 264/40.1; 264/335; 425/137; 425/139; 425/397; 425/403.1; 425/437; 425/444; 294/65; 414/752
[58] Field of Search ....................... 414/225, 625, 752; 901/40; 198/486; 294/64.1, 65; 100/215; 425/436 R, 444, 347, 400, 403.1, 137, 139, 145; 264/40.1, 335

[56] References Cited

U.S. PATENT DOCUMENTS

| | | | |
|---|---|---|---|
| 2,739,349 | 3/1956 | Strauss | 425/436 X |
| 2,744,286 | 5/1956 | Carpenter et al. | 425/437 X |
| 3,040,378 | 6/1962 | Rodgers et al. | 425/437 X |
| 3,081,486 | 3/1963 | Skoorc | 425/436 X |
| 3,142,863 | 8/1964 | Mazzoni | 425/437 X |
| 3,153,262 | 10/1964 | Steketee | 425/444 X |
| 3,526,690 | 9/1970 | Bachman | 425/437 X |
| 3,700,375 | 10/1972 | Rees | 425/444 X |
| 4,204,824 | 5/1980 | Paradis | 425/436 R |

Primary Examiner—J. Howard Flint, Jr.
Attorney, Agent, or Firm—R. L. Phillips

[57] ABSTRACT

Method and apparatus are disclosed using a robot to load and unload precut pieces of sheet molding compound and the like between an upper die and a lower die of a sheet molding press. The steps in the method include having the robot ready and hold a raw piece while the press is closed and molding a piece already therein, opening the press on completion of molding the piece therein and suspending such molded piece independent of the robot in a predetermined intermediate position between the dies as the press opens, provided such molded piece does not stick to the upper die, having the robot enter the raw piece into the press between the molded piece and the lower die, having the robot sense the presence of the molded piece in the suspended position and in that event secure same thereto, or if not so present and stuck in the upper die then withdraw the raw piece from the press, and having the robot with the securing thereto of the molded piece only then unload the raw piece on the lower die and retract the molded piece from between the dies for subsequent press molding of the thus loaded raw piece.

4 Claims, 4 Drawing Figures

METHOD AND APPARATUS FOR LOADING AND UNLOADING SHEET MOLDING COMPOUND IN AND FROM A PRESS

TECHNICAL FIELD

This invention relates to method and apparatus for loading and unloading precut pieces of sheet molding compound in and from a press and more particularly to a robotic method and apparatus for performing both the loading and unloading with only one press entry.

BACKGROUND OF THE INVENTION

In the press molding of sheet molding compound which is commonly referred to as SMC, the pliability of the material makes it difficult to handle in loading in the press. Normally, this, as well as the unloading of the molded part after pressing, is done manually along with inspection for sticking or hang-up of the molded part in the press. It is desirable that these operations be handled more efficiently, and particularly in less time.

SUMMARY OF THE INVENTION

The present invention meets these objectives with a method and apparatus employing a robot for loading and unloading precut pieces of SMC and the like, between an upper die and a lower die of a sheet molding press during only one entry. In the apparatus, an end effector on an arm of the robot is provided with holders and presence sensors for both the raw and molded part and the upper die is provided with molded part suspenders. The method then comprises having the end effector on the arm of the robot ready and hold a raw charge of SMC while the press is closed and molding a charge already therein. Then following molding and using the suspenders on the upper die, the molded part is suspended independent of the robot in a predetermined intermediate position between the dies as the press opens provided the part does not stick to the upper die. The robot is then caused to enter with the raw charge between the molded part and the lower die. The sensors on the robot then sense for the presence of the molded part in the suspended position and in that event, secure same thereto with the holders; or, if not so present and stuck on the upper die, the robot is caused to attempt a retrieval and if unsuccessful, is then caused to withdraw the raw charge from the press to permit removal of the stuck part. Provided the molded part is not stuck on the upper die, the robot with the securing thereto of this part only then unloads the raw charge onto the lower die and thereafter retracts with the molded part from between the dies for subsequent press molding of the thus loaded raw charge.

These and other objects, advantages and features of the present invention will become more apparent from the following description and drawing in which:

DESCRIPTION OF THE PREFERRED EMBODIMENT

Figure 1:
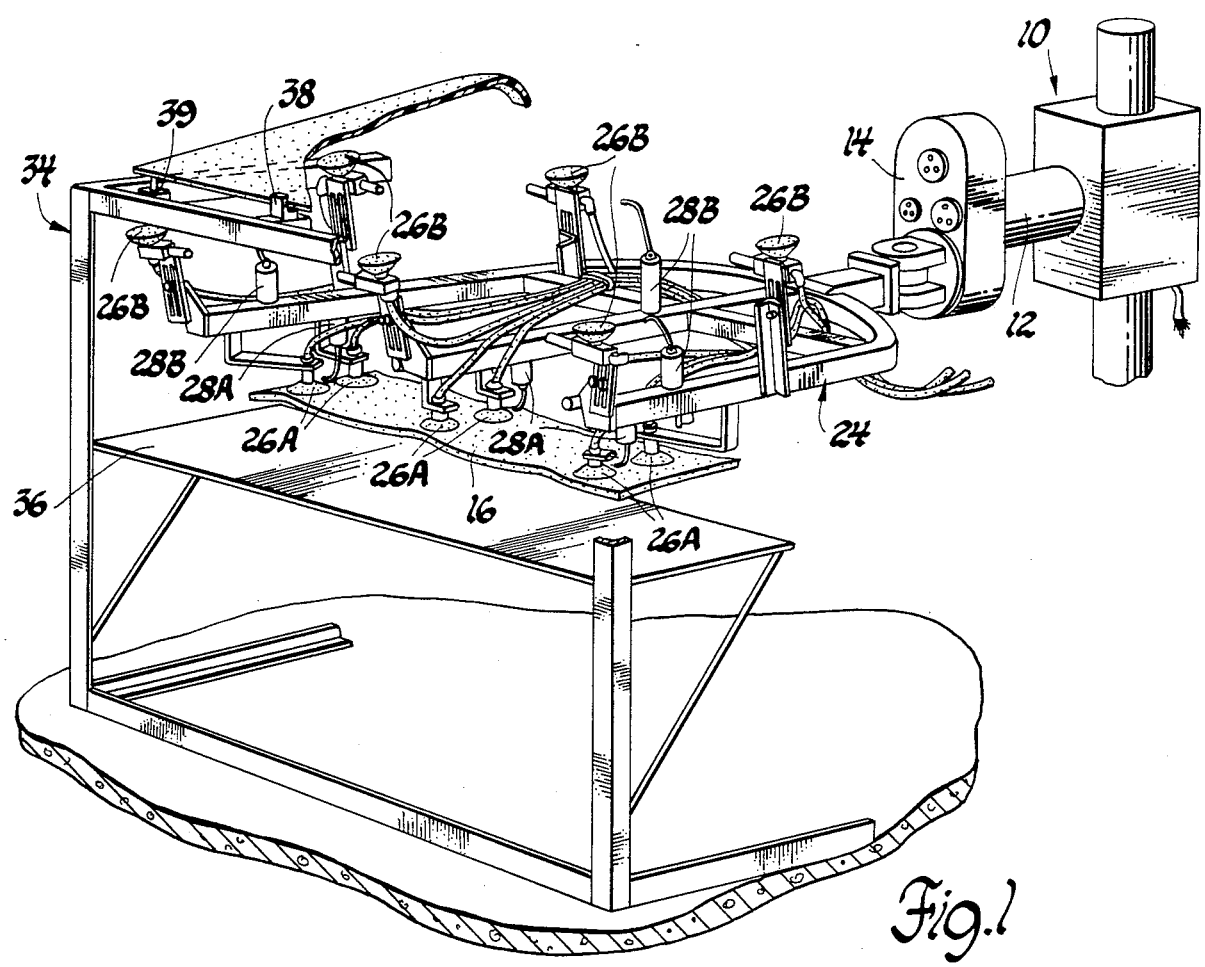
FIG. 1 is a three-dimensional illustration of the preferred form of the apparatus except for that on the press and wherein the robot arm has picked up a raw charge after having deposited a molded part at an off-press station.
Figure 2:
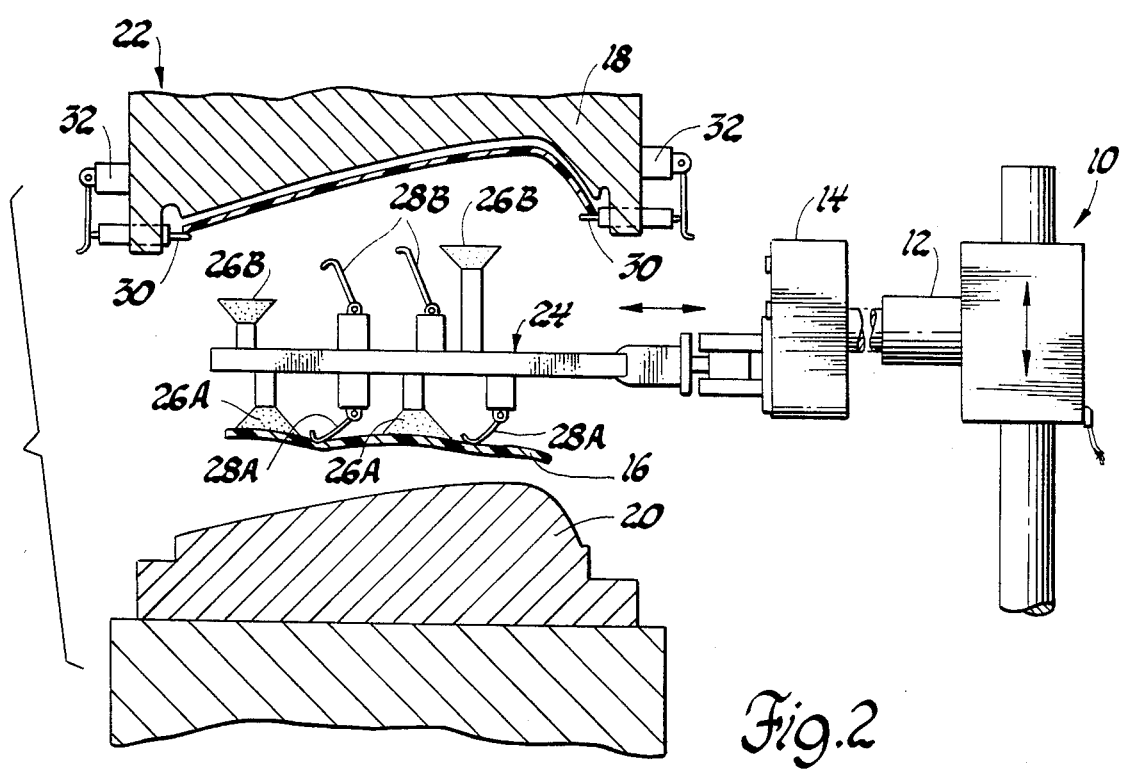
FIG. 2 is a diagrammatic view showing the robot in FIG. 1 having entered a sheet molding press with the raw charge and wherein the upper die of the press which is shown only partially and in section is provided with the preferred embodiment of the remaining parts of the apparatus.

Referring to FIGS. 1 and 2, there is shown a robot generally designated as 10 having an arm 12 on which is mounted an end effector 14 for loading and unloading precut pieces 16 of sheet molding compound (SMC) between an upper die 18 and a lower die 20 of a sheet molding press 22. The robot 10, apart from the SMC holders and presence sensors subsequently described, and the sheet molding press 22, apart from the SMC suspenders subsequently described, are conventional and therefore, are only partly shown; and their operation will be described only insofar as is believed necessary to understanding the present invention.

As best seen in FIG. 1, the end effector 14 has a three-fingered loader/unloader fork 24 whose tines have a plurality of part holder devices 26 in the form of vacuum operated suction cups and a plurality of part presence sensors 28 in the form of limit switches mounted on and extending from their upper and lower sides. Then apart from the robot as shown in FIG. 2, the apparatus has a plurality of part suspenders 30 in the form of retractable finger devices and part presence sensors 32 in the form of limit switches associated with the respective suspenders, all mounted on the upper press die 18. In addition, there is provided as shown in FIG. 1, a combined raw charge and molded part station generally designated as 34 having a lower platform 36 for supporting a raw preformed charge of SMC for pickup by the robot and delivery to the press and an upper platform with support pads 38 and limit switches 39 (only one of each shown) for respectively supporting and detecting the presence of a molded or finished part delivered from the press by the robot. And it will be understood that a raw charge may be placed either manually or with another robot on the lower platform 36, but that the robot 10 is employed to both pick up the raw charge for the press and return a finished part to the upper platform 38 where it may be removed manually or by another robot.

Describing now the preferred method of loading and unloading the pieces of SMC in and from the press using the above apparatus, the first step begins at a "home" position, meaning as outside the press with the robot 10 operated so that the end effector fork 24 is poised over the raw SMC charge pick-up platform 36 (see FIG. 1). For the following description, the lower vacuum cups 26 used to pick up and deposit the raw SMC charge, have additionally been labelled A, while the upper vacuum cups used to pick up and deposit the finished or molded part have additionally been labelled B. In this first step, vacuum is applied through the hoses shown to the vacuum cups 26A so that they are on, and the robot is then caused to move the end effector fork downward to place these cups on the raw SMC charge. A short delay is then provided as the vacuum cups draw tight with the lower limit switches 28 on this same side and also similarly labelled A then being actuated to insure the presence of the raw charge. With the end effector fork thereby holding the raw charge, the robot arm 12 is programmed to then proceed to a ready position just outside of the press 22 which is closed and molding a charge already therein or else is ready for press startup. Upon opening of the press, a signal is transmitted to the robot to manipulate the end effector fork to enter the press with the raw charge at which time this signal also turns the upper vacuum cups 26B on by triggering the application of vacuum thereto.

Figure 3:
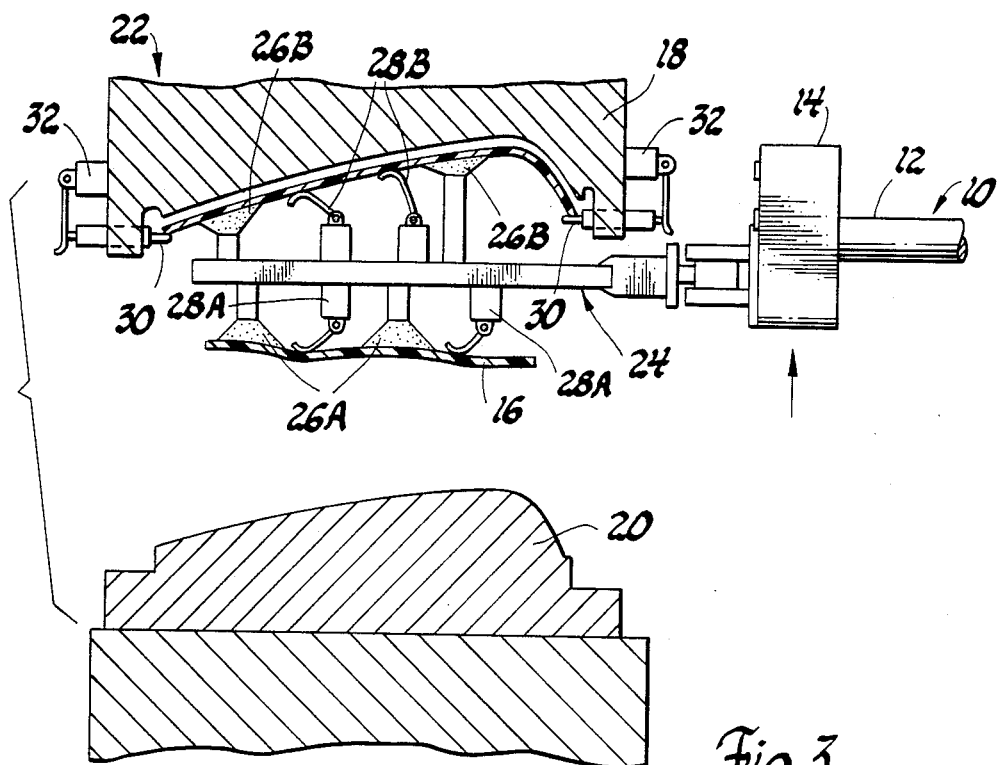
FIG. 3 is a view similar to FIG. 2 but showing the robot arm positioned to unload a molded part from the upper die.
Figure 4:
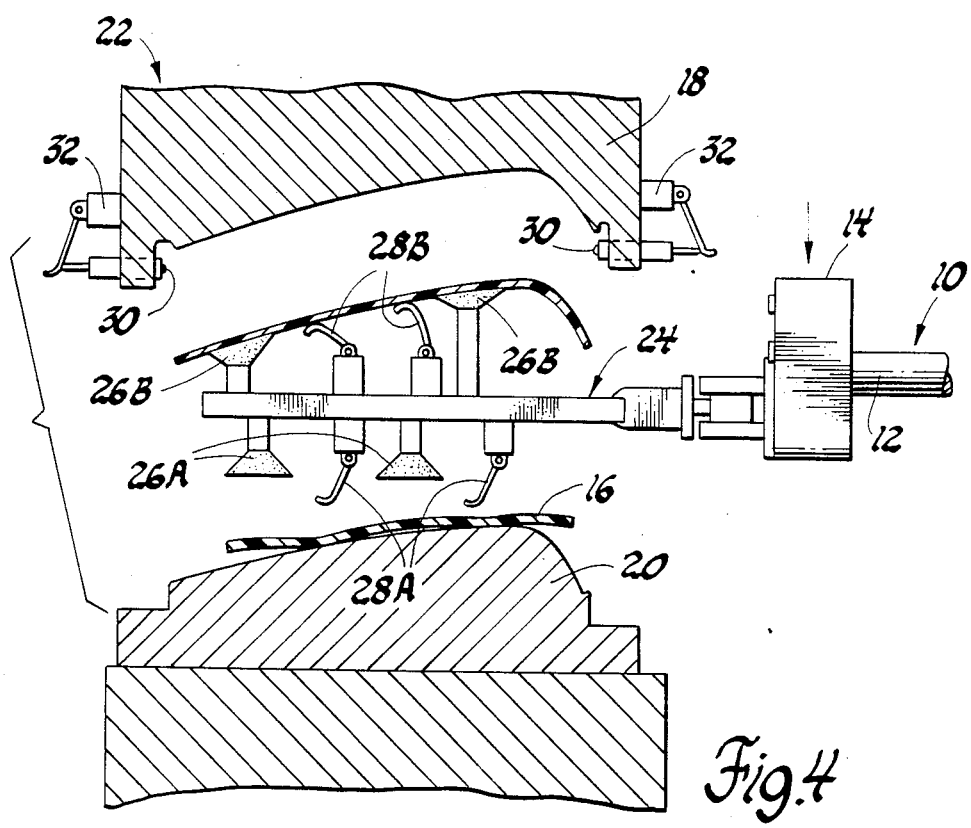
FIG. 4 is a view similar to FIG. 2 and following on FIG. 3 and showing the robot arm unloading a raw charge on the lower die after having unloaded the molded part from the upper die.

Normally, as the press opens with the upper die 18 lifting to an elevated full open position as shown in FIG. 2, the press molded part will not stick to either of the dies and the finger devices 30 secured to the upper die then pickup and suspend the molded part therefrom but close thereto in a predetermined position intermediate the two dies. The end effector fork is then moved by the robot into the press and thereafter upward to engage the suction cups 26B against the underside of the molded part while also actuating the limit switches 28B as shown in FIG. 3. If these limit switches do not make, the robot is then programmed to enter a subroutine which assumes the molded part is stuck on the upper die rather than resting on the retractable finger suspenders 30. In that case, the robot moves the end effector fork further upward to a new position (higher) to contact the molded part with the vacuum cups 26B and to actuate the limit switches 28B. The signal from these limit switches is then used to retract the fingers 30 to both release the molded part to the suction cups 26B and to actuate the limit switches 32. The latter limit switches are used to signal the robot to then drop the end effector fork to the lower die 20 and deposit the raw SMC charge thereon by relieving the vacuum to the suction cups 26A. If the limit switches 28B on the upper die are open, it is assumed that the molded part is stuck in the upper die. In that case, the robot is programmed so as to not proceed with depositing the raw SMC charge on the lower die. Instead, the robot is programmed to then withdraw the end effector fork out of the press and off to the side to allow an operator to strip the molded part out manually.

Assuming the molded part is not stuck and is secured to the end effector fork with the suction cups 26B, the vacuum cups 26A are signalled off by the robot at its lowered position, at which time the robot is then programmed to raise the end effector fork and move out of the press with the limit switches 28A open and indicating absence of the raw charge. If raw charge presence is indicated by the limit switches 28A or molded part absence is indicated by the limit switches 28B, or both, after the step of retracting the finger suspenders 30, both the robot and press are programmed to stop and hold. At this point, the molded part may be askew or the raw SMC charge stuck to the vacuum cups 26A and such hold then allows an operator to decide what to do.

Continuing on with no such problems encountered, as the end effector fork with the molded part retained thereon clears the press, the robot's position is programmed to signal the press to begin its mold cycle with this cycle being controlled by a press computer (not shown) which generates the signal for the press opening earlier described. With the robot having removed the molded part, the robot is then programmed to proceed to deposit same on the upper platform support pads 38 which event is used to actuate the limit switches 39 to signal the vacuum cups 26B to cycle off to release the part. The robot is then programmed to clear the upper platform and proceed to the lower platform 36 on which in the meantime there has been placed another raw charge. The arrival of the end effector fork at the raw charge platform signals the vacuum cups 26A on and the robot to repeat the above loading and unloading sequence of the press.

Thus, it will be appreciated that a single robot is utilized to both load and unload the sheet molding press, and with only one entry of the robot into the press thereby minimizing the time required to effect these operations. Furthermore, it will be understood that there may be other subroutines or additional steps to facilitate overcoming a stuck or askew piece in the press. It will also be understood that while the use of conventional suction cups, limit switches and retractable fingers are preferred, other devices suitable to handling an SMC piece or specifically adapted to handle this or other kinds of material may also be employed. Thus, the preferred embodiment is intended to be illustrative of the invention which may be modified within the scope of the appended claims.

The embodiments of the invention in which an exclusive property or privilege is claimed are defined as follows:

1. A method of using a robot to load and unload precut pieces of sheet molding compound and the like between an upper die and a lower die of a sheet molding press comprising the steps of:

having the robot ready and hold a raw piece while the press is closed and molding a piece already therein, opening the press on completion of molding the piece therein and suspending such molded piece independent of the robot in a predetermined intermediate position between the dies as the press opens, provided such molded piece does not stick to the upper die, having the robot enter the raw piece into the press between the molded piece and the lower die, having the robot sense the presence of the molded piece in the suspended position and in that event secure same thereto, and if not so present and stuck in the upper die then withdraw the raw piece from the press, and having the robot with the securing thereto of the molded piece only then unload the raw piece on the lower die and retract the molded piece from between the dies for subsequent press molding of the thus loaded raw piece.

2. A method of using a robot to load and unload precut pieces of sheet molding compound and the like between an upper die and a lower die of a sheet molding press comprising the steps of:

having the robot ready and hold a raw piece while the press is closed and molding a piece already therein, opening the press on completion of molding the piece therein and suspending such molded piece from the upper die in a predetermined intermediate position between the dies as the press opens, provided such molded piece does not stick to the upper die, having the robot enter the raw piece into the press between the molded piece and the lower die, having the robot sense the presence of the molded piece in the suspended position and in that event secure same thereto, and if not so present and stuck in the upper die attempt retrieval but if unsuccessful, then withdraw the raw piece from the press, and having the robot with the securing thereto of the molded piece only then unload the raw piece on the lower die and retract the molded piece from between the dies for subsequent press molding of the thus loaded raw piece.

3. Apparatus for using a robot to load and unload precut pieces of sheet molding compound and the like between an upper die and a lower die of a sheet molding press characterized by:

end effector means for readying and holding a raw piece on the robot while the press is closed and molding a piece already therein, suspender means for suspending such molded piece independent of the robot in a predetermined intermediate position between the dies as the press opens, provided such molded piece does not stick to the upper die, means for causing the end effector means to enter the raw piece into the press between the molded piece and the lower die, means on said end effector means for selectively sensing the presence of the molded piece in the suspended position and in that event to secure the molded piece to said effector means and, if not so present and stuck in the upper die then withdraw the raw piece from the press, and means for causing the end effector means with the securing thereto of the molded piece to only then unload the raw piece on the lower die and retract the molded piece from between the dies for subsequent press molding of the thus loaded raw piece.

4. Apparatus for using a robot to load and unload precut pieces of sheet molding compound and the like between an upper die and a lower die of a sheet molding press characterized by:

end·effector means including releasable suction devices for readying and holding a raw piece on an arm of the robot while the press is closed and molding a piece already therein, suspender means on the upper die for releasably suspending such molded piece in a predetermined intermediate position between the dies as the press opens, means for causing the end effector means to enter the raw piece into the press between the molded piece and the lower die, said end effector means further including limit switches for sensing the presence of the molded piece in the suspended position and also including additional releasable suction devices for securing same thereto, and means for causing the end effector means with the securing thereto of the molded piece to only then unload the raw piece on the lower die and retract the molded piece from between the dies for subsequent press molding of the thus loaded raw piece.

* * * * *